United States Patent
Maleki

(10) Patent No.: US 6,347,541 B1
(45) Date of Patent: Feb. 19, 2002

(54) TWO-POINT CALIBRATION OF A LONGITUDINAL ACCELERATION SENSOR

(75) Inventor: Ali F. Maleki, Canton, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/342,764

(22) Filed: Jun. 29, 1999

Related U.S. Application Data

(60) Provisional application No. 60/090,991, filed on Jun. 29, 1998.

(51) Int. Cl.$^7$ .............................................. G01P 21/00
(52) U.S. Cl. .......................... 73/1.38; 702/87; 702/104
(58) Field of Search ............................ 73/1.38, 1.37; 702/87, 104, 96, 141

(56) References Cited

U.S. PATENT DOCUMENTS

| | | | |
|---|---|---|---|
| 3,147,626 A | * | 9/1964 | Fischer et al. ............ 73/1.38 X |
| 3,673,395 A | * | 6/1972 | Tripp ........................... 702/96 |
| 4,188,816 A | * | 2/1980 | Meirson ....................... 73/1.38 |
| 5,124,938 A | * | 6/1992 | Algroin ....................... 702/141 |
| 5,307,274 A | * | 4/1994 | Takata et al. ............ 702/141 X |
| 5,369,580 A | * | 11/1994 | Monji et al. ............. 702/141 X |
| 5,531,115 A | * | 7/1996 | Erdley ..................... 702/104 X |

FOREIGN PATENT DOCUMENTS

| | | | | |
|---|---|---|---|---|
| EP | 542719 A2 | * | 5/1993 | ................. 73/1.38 |
| SU | 492816 | * | 11/1975 | ................. 73/1.38 |
| SU | 1379744 A1 | * | 3/1988 | ................. 73/1.38 |

* cited by examiner

Primary Examiner—Thomas P. Noland
(74) Attorney, Agent, or Firm—Rader, Fishman & Grauer PLLC

(57) ABSTRACT

A method of calibrating an acceleration sensor by utilizing a two point analysis involves positioning the acceleration sensor at a first angle, measuring a first output voltage and positioning the sensor at a second angle and measuring a second output voltage and thereafter calculating a sensitivity ratio and a zero position output voltage based on the angles and voltages. Further, the method of the present invention optionally includes a second calibration after the acceleration sensor is installed onto a vehicle. Thus, the present invention improves accuracy in determining actual vehicle acceleration.

7 Claims, 3 Drawing Sheets

TWO-POINT CALIBRATION OF A LONGITUDINAL ACCELERATION SENSOR

This application claims the benefit of U.S. provisional application Ser. No. 60/090,991, filed Jun. 29, 1998.

FIELD OF THE INVENTION

The present invention relates to a method of calibrating an acceleration sensor and more particularly to providing a multiple point calibration system.

BACKGROUND OF THE INVENTION

Acceleration sensors, also called accelerometers, are typically used in motor vehicle applications including, for example, anti-lock braking systems. Signals from the acceleration sensor indicating the instantaneous acceleration of the vehicle are used in the control logic for controlling anti-lock braking.

An acceleration sensor senses linear acceleration parallel to its sensing plane. Internally, some known acceleration sensors contain a silicone proof mass that is suspended between two stationary capacitor plates by cantilever beam springs. When the sensor body is accelerated, the movement is transmitted to the mass via the springs. The springs bend to balance the inertial force of the mass. Due to this bending the relative position of the mass between the two plates is changed. This change causes a change in the capacitance between the two plates which is measured. The internal sensor electronics calculate the acceleration by solving the engineering formulas for force equals a spring constant times displacement and force equals mass times acceleration. Capacitance is a function of displacement and can be measured and converted to a voltage that is readable by an analog-digital converter. The sensor further contains certain parameters for converting capacitance to voltage. The parameters include acceleration-to-voltage ratios and the zero position output value. Thus, capacitance can be converted to voltage which can then be converted to acceleration.

In vehicle brake systems, it is important to have an accurate indication of instantaneous acceleration to provide accurate and consistent braking control actions. In the past, it has been known to calibrate an acceleration sensor with the sensor at a zero degree angle and using only a single point of reference. Thus, correction is only provided for the zero position output voltage at a zero degree angle. Known acceleration sensors for vehicles do not account for a sensor being at an inclined angle, including accounting for a pitch angle or a yaw angle.

SUMMARY OF THE INVENTION

The present invention is directed to a method of calibrating an acceleration sensor for a vehicle, the acceleration sensor being connected to an electronic control unit, comprising the steps of positioning the acceleration sensor at a first angle A1 and communicating the first angle A1 to the electronic control unit. Measuring a first output voltage V1 of the acceleration sensor at the first angle A1. Positioning the acceleration sensor at a second angle A2 and communicating the second angle A2 to the electronic control unit. Measuring a second output voltage V2 of the acceleration sensor at the second angle A2 and calculating a sensitivity factor as a ratio equal to a difference between the first and second output voltages V2−V1 divided by a difference between the first and second angles A2−A1. Another step includes calculating a zero position output voltage which is equal to the first output voltage minus a product of the sensitivity factor times a sine of the first angle.

A further method according to the present invention includes installing the acceleration sensor onto a vehicle and then further calibrating the sensor comprising the steps of: placing the vehicle at a predetermined third angle A3 and communicating the third angle A3 to the electronic control unit. Measuring a third output voltage of the acceleration sensor at the third angle A3. Calculating a second sensitivity factor as a ratio equal to a difference between the third output voltage and one of the first and second output voltages V3−V2 (or V1) divided by a difference between the third angle and one of the first and second angles A3−A2 (or A1). Also, calculating a second zero position output voltage which is equal to the third output voltage minus a product of the sensitivity factor times a sine of the third angle.

Any or all of the first, second and third angles can be pitch angles and/or yaw angles.

According to another embodiment of the present invention, there is a method of determining a characteristic line for an acceleration sensor comprising: positioning the acceleration sensor at a first angle A1 and measuring a first output voltage V1 of the acceleration sensor at the first angle A1. Positioning the acceleration sensor at a second angle A2 and measuring a second output voltage V2 of the acceleration sensor at the second angle A2. Calculating a sensitivity factor, m, as a ratio according to the equation:

$$m=(V2-V1)/(A2-A1);$$

calculating a zero position output voltage V0 according to the equation:

$$V0=V1-(m \times \sin(A1));$$

determining a characteristic line for the acceleration sensor using the equation:

$$Vi=V0+(m \times Xg)$$

wherein variable Vi is instantaneous output voltage, V0 is the zero position output voltage, m is the sensitivity factor and Xg is an amount of instantaneous acceleration force.

Optionally, but preferably, the method of calibrating an acceleration sensor for a vehicle includes an acceleration sensor having a silicon proof mass resiliently suspended between a pair of capacitor plates and connected to an electronic control unit for accurate sensing of vehicle acceleration. In addition to the multiple steps of communicating, measuring and calculating various parameters, the present method contemplates selectively storing any or all parameter values.

Thus, the present invention provides a method for more accurately calibrating an acceleration sensor by utilizing two or more reference points that correspond to different angular positions of the acceleration sensor. In addition, a further calibration is contemplated after installation of the sensor on a vehicle. Accordingly, the present invention provides a method for calibrating an acceleration sensor that improves the accuracy of the sensor output and the accuracy and efficiency of the accompanying vehicle systems, such as braking control, which rely on acceleration input values.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
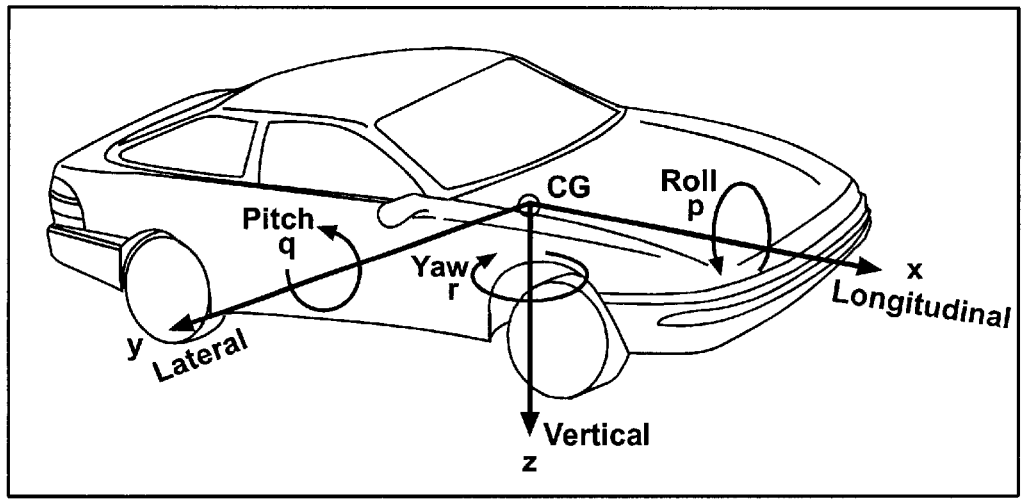
FIG. 1 is schematic view of a vehicle showing respective axes for roll, pitch, and yaw.

FIG. 1 shows a schematic view of a vehicle including the respective axes for roll, pitch, and yaw. As shown, roll is defined as rotation about the longitudinal X axis. Pitch relates to rotation about the lateral Y axis and yaw is defined by rotation about the vertical Z axis.

An acceleration sensor (not shown) is a linear sensing device with an output that is linearly related to the input acceleration force, g. The sensor has a ratiometric output in a relation to its supply voltage. A voltage output signal from the acceleration sensor is sent to an electronic control unit (not shown) for processing and controlling other vehicle functions such as throttle position, braking control, clutch control, etc. For example, with a 5 volt supply, the acceleration sensor output has a range of 0 to 5 volts. The center voltage is 2.5 volts and corresponds to 0 acceleration or 0 g. A typical acceleration-to-voltage ratio for an acceleration sensor is 1.5 volts/g. Thus, an equation for a straight line can be used to describe the acceleration sensor output as follows:

$$\text{Vout} = 0 \text{ g voltage} + (Xg \cdot \text{volts/g ratio}) \quad \text{Equation (1)}$$

where Vout is the output voltage of the acceleration sensor, 0 g voltage is the voltage output of the sensor at a zero acceleration position, Xg is a variable number of g forces, and volts/g ratio is the acceleration-to-voltage ratio.

Figure 2:
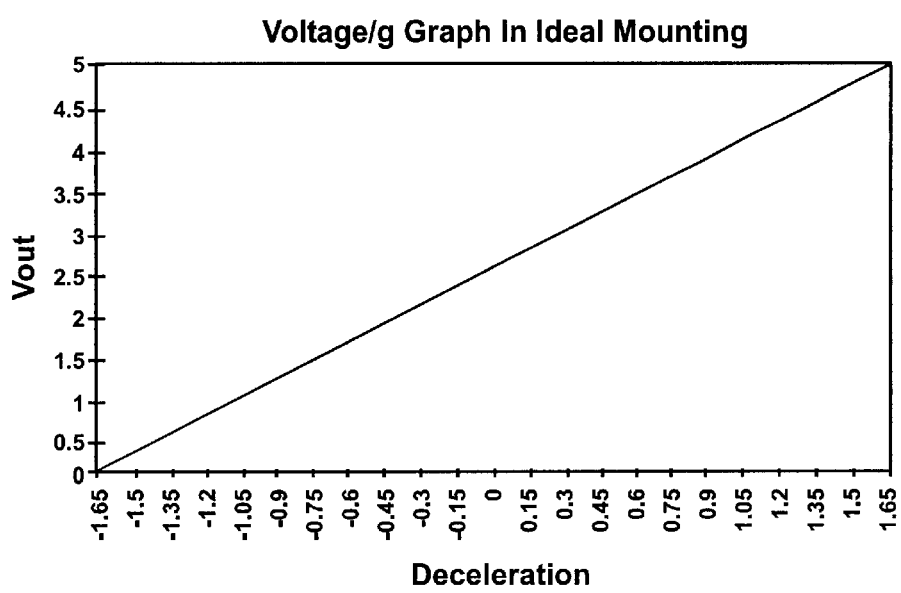
FIG. 2 is a graph showing output voltage versus deceleration for an acceleration sensor in an ideal mounting situation.
Figure 3:
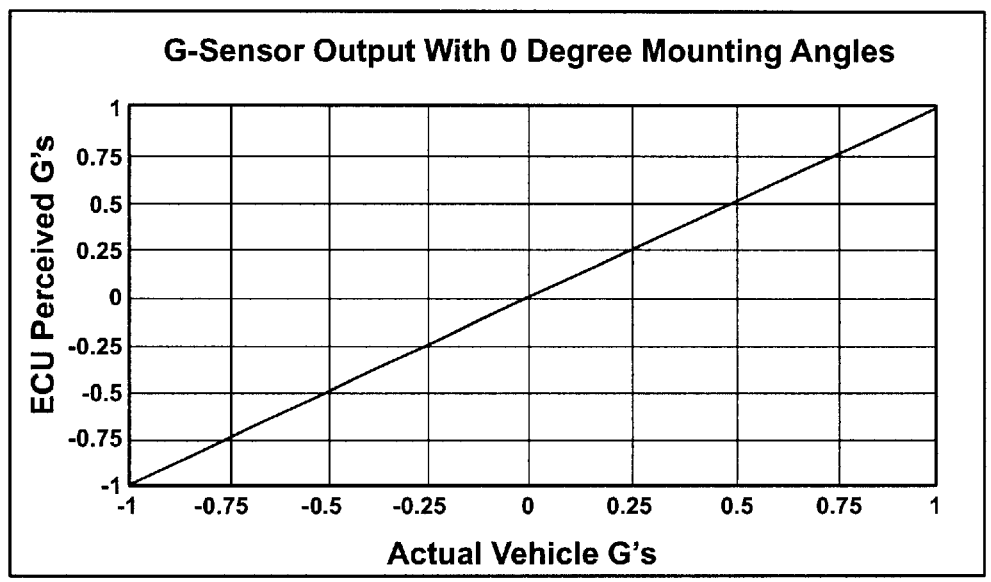
FIGS. 3 is a graph of perceived acceleration versus actual vehicle acceleration with an acceleration sensor output at zero degree mounting angles.

Assuming the sensor of the previous example, the output voltage at 1 g would be calculated as Vout 2.5 v+(1 g ·1.5 v/g)=4.0 volts. Therefore, when a vehicle incorporating the acceleration sensor accelerates to 1 g, the sensor should output 4.0 volts. Further, if the acceleration force is −0.5 g, then Vout would equal 1.75 volts. FIG. 2 shows a graph of voltage output per g of acceleration force for such an acceleration sensor that outputs 2.5 volts at 0 g. The slope of the line is 1.5 v/g. Thus, the acceleration-to-voltage ratio equals the slope of the line describing an acceleration sensor. However, the graph in FIG. 2 presumes that the acceleration sensor is perfectly mounted without any angular variations in any orthogonal plane. As a result, the acceleration sensor will always accurately perceive the actual vehicle acceleration force in a one-to-one relationship. FIG. 3 shows the graph of perceived acceleration force by the electronic control unit connected to the perfectly mounted sensor versus the actual acceleration force acting on the vehicle.

However, in actual practice, acceleration sensors are mounted imperfectly at different angular positions, which affect the sensitivity of the sensors. An angular variation causes the voltage output of the acceleration sensor and, therefore, the perceived acceleration by the electronic control unit, to be different than the actual acceleration of the vehicle. If the acceleration sensor is mounted at a pitch or yaw angle of Θ, then its sensitivity is diminished by a factor of cosine Θ. Sensitivity corresponds to the slope of the line, which corresponds to the acceleration-to-voltage ratio. Therefore, new sensitivity equals old sensitivity times cos Θ. Stated differently, the new acceleration-to-voltage ratio equals the old acceleration-to-voltage ratio times cos Θ.

Similarly, a pitch or yaw angle of Θ affects the sensor's zero acceleration position output voltage. The 0 g output voltage is increased or decreased by the gravity component in the sensing direction. Thus, the new 0 g voltage equals the old 0 g voltage plus the product of the acceleration-to-voltage ratio times sine Θ.

Figure 4:
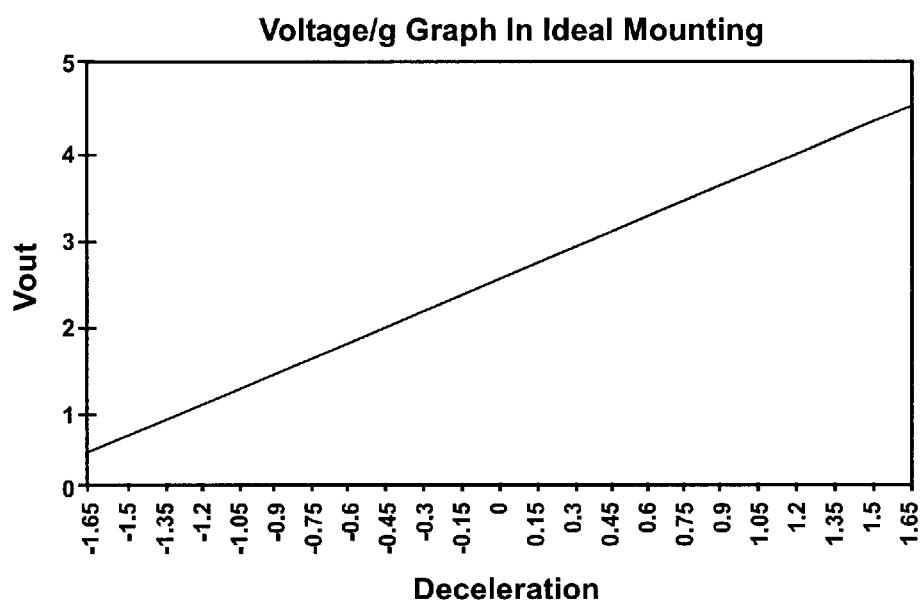
FIG. 4 is a graph illustrating output voltage versus deceleration with an acceleration sensor at a 15 degree pitch angle.

For example, if an acceleration sensor having an acceleration-to-voltage ratio of 1.5 v/g and a 0 g voltage of 2.5 is mounted to a vehicle at a 15 degree pitch angle (rotation about the y-axis) then, the acceleration-to-voltage ratio changes to 1.5 v/g times cos Θ or 1.45 v/g. Thus, the slope of the characteristic line is changed as illustrated in the graph of FIG. 4, which represents output voltage versus deceleration for a sensor mounted at a 15 degree pitch angle. In addition, the 0 g voltage is changed to 2.89 volts (2.5 v+(1.5·sin (15))) instead of 2.5 volts.

Figure 5:
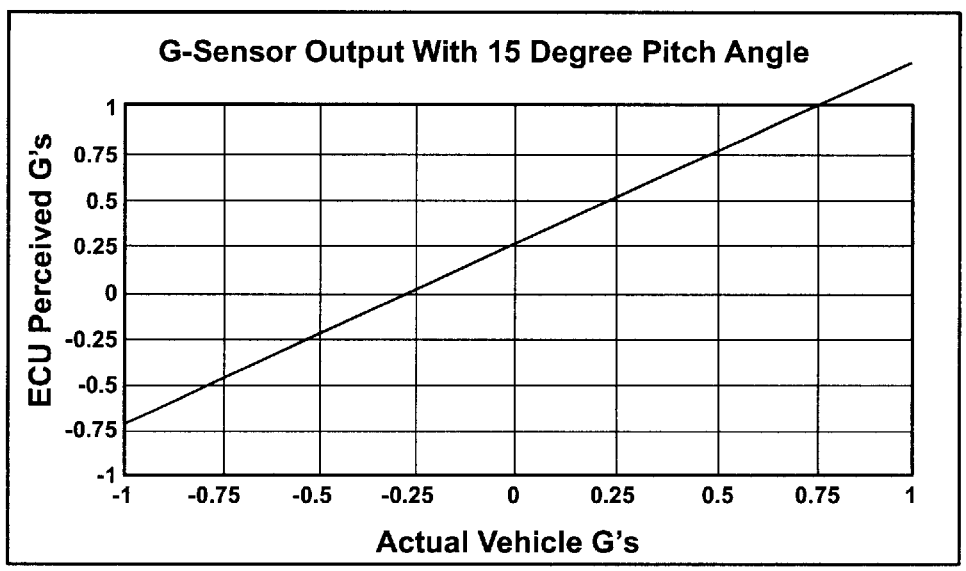
FIG. 5 shows a graph of perceived acceleration versus actual vehicle acceleration with an acceleration sensor at a 15 degree pitch angle.

The change in output voltage and acceleration-to-voltage ratio for the sensor can seriously impair an automotive control system where the electronic control unit is utilizing a different acceleration-to-voltage ratio or different 0 g voltage. FIG. 5 shows a graph of the perceived acceleration force by the electronic control unit versus the actual vehicle acceleration when an acceleration sensor is mounted at a pitch angle of 15 degrees. The graph clearly shows that a sensor mounted at a 15 degree pitch angle will cause the electronic control unit to perceive 0.26 g when the actual vehicle acceleration is zero. Such an inaccurate measurement of acceleration is undesirable when controlling vehicle functions such as braking.

The present invention proposes an improved calibration for a vehicle acceleration sensor. First, the slope (acceleration-to-voltage ratio) and offset (0 g voltage) values for the characteristic line of the sensor must be determined and adjusted in the memory of the electronic control unit. The control unit optionally, but preferably has default values for each parameter, such as 1.5 v/g and 2.5 volts. The method according to the present invention utilizes two points for calibration. The two points specify the characteristic line which is simplified as y=mx+k, where m and k correspond to sensitivity (acceleration-to-voltage ratio) and 0 g voltage, respectively. The variables y and x correspond to output voltage and sine Θ, respectively. Thus, with two points (x1, y1) and (x2, y2), the values of sensitivity (acceleration-to-voltage ratio) and 0 g voltage can be calculated according to the equations:

$$m = (y2-y1)/(x2-x1) \quad \text{Equation (2)}$$

and $$k = y1 - ((y2-y1)/(x2-x1) \cdot x1) \quad \text{Equation (3).}$$

The calibration for the electronic control unit and sensor will now be described. First, the sensor and control unit are placed in position A with a known pitch angle of Θ. The angle is communicated to the control unit and a first calibration point is acquired. The output voltage of the sensor is measured and corresponds to the gravity component at angle Θ. Accordingly, V1out=2.5+1.5·(sin Θ). The same procedure is repeated for a second position B at an angle of Θ'. Thus, V2out=2.5+1.5·(sin Θ'). The two known points of (sin Θ, V1out), (sin Θ, V2out) can be used to find the variables for:

sensitivity (acceleration-to-voltage ratio)=m=(V2out−V1out)/(sin Θ'−sin Θ)

0 g voltage=k=V1out−((V2out−V1out)/(sin Θ'−sin Θ))(sin Θ))

The calibration points can be determined at any two angles, for example, 0 and 90 degrees. However, it is preferable to use −90 and 90 degrees to provide an even wider range and better accuracy.

For example, if an acceleration sensor is mounted at a 5 degree pitch, then the calibration for the control unit and sensor would be as follows. Before performing the two point calibration according to equations 2 and 3 above, the initial values for sensitivity (acceleration-to-voltage ratio) and 0 g voltage must be determined for a 5 degree pitch. Sensitivity= $1.5 \cdot \cos(5)=1.494$. 0 g voltage=$2.5+\sin(5)=2.631$. Next, the two point calibration is performed. Predetermined points, such as −90 and 90 degrees, are used and measurements are taken. For point A at 90 degrees, the sin(90) is 1 and V1out is $2.631+1.494 \sin(90)=4.125$ volts. For point B at −90 degrees, the sin(−90) is −1 and V2 out is $2.631+1.494 \sin(-90)=1.136$ volts.

Therefore, the two points are (1, 4.125) and (−1, 1.136). Using equations (2) and (3) above, sensitivity (acceleration-to-voltage ratio)=m =$(1.136-4.125)/(-1-1)=1.494$ volts/g 0 g voltage=k=$4.125-(1.494 \cdot 1)=2.631$ volts.

Therefore, the characteristic line for the sensor output voltage is $V=k+(m \cdot Xg)$, in this example, $V=2.631+(1.494 \cdot Xg)$. The parameters m and k corresponding to sensitivity (acceleration-to-voltage ratio) and 0 g voltage, respectively, are calculated at the sensor manufacturer's plant and optionally but preferably are stored in the memory of the control unit.

In addition, the present method optionally, but preferably, contemplates further calibration of the acceleration sensor after the sensor is mounted to a vehicle at the vehicle manufacturer's plant. Since the sensor is fixedly mounted to the vehicle, only a single new angular point C can be acquired. Thus, one of the two previous points A or B are used to define an installed characteristic line in conjunction with new point C.

At the vehicle manufacturer's site, after the sensor is installed onto a vehicle, the vehicle is placed at a known incline, preferably 0 degrees and a single point C is acquired. In this case, point C includes sin(0), which is 0 and V3out=is measured from the sensor and corresponds to the 0 g voltage plus sensitivity sin (0). Point C at 0 degrees will be (0, V3out). And, if using previously stored point A at 90 degrees, (1, 4.125) is used along with new point C to calculate and define the characteristic line for the installed acceleration sensor.

Thus, the present invention provides a method for accurately calibrating an acceleration sensor and control unit using a two point analysis. Further, the present invention provides for a second calibration after installation onto a vehicle using the single vehicle installation point along with one of the earlier two points that were stored in memory. Accordingly, the present invention provides for greater accuracy in measuring and calculating the actual acceleration of the vehicle.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A method of calibrating an acceleration sensor for a vehicle, the acceleration sensor being connected to an electronic control unit, comprising the steps of:
    positioning the acceleration sensor at a first angle A1;
    communicating the first angle A1 to the electronic control unit;
    measuring a first output voltage V1 of the acceleration sensor at the first angle A1;
    positioning the acceleration sensor at a second angle A2;
    communicating the second angle A2 to the electronic control unit;
    measuring a second output voltage V2 of the acceleration sensor at the second angle A2;
    calculating a sensitivity factor as a ratio equal to a difference between the first and second output voltages V2−V1 divided by a difference between the first and second angles A2−A1;
    calculating a zero position output voltage which is equal to the first output voltage minus a product of the sensitivity factor times the sine of the first angle.

2. The method of claim 1, wherein the first angle is approximately 90 degrees and the second angle is approximately −90 degrees.

3. The method of claim 1, wherein the first angle is approximately 0 degrees and the second angle is approximately 90 degrees.

4. The method of claim 1, further comprising:
    installing the acceleration sensor onto the vehicle and then further calibrating the sensor comprising the steps of:
    placing the vehicle at a predetermined third angle A3;
    communicating the third angle A3 to the electronic control unit
    measuring a third output voltage of the acceleration sensor at the third angle A3;
    calculating a second sensitivity factor as a ratio equal to a difference between the third output voltage and one of the first and second output voltages V3−V2/1 divided by a difference between the third angle and one of the first and second angles A3−A2/1;
    calculating a second zero position output voltage which is equal to the third output voltage minus a product of the sensitivity factor times the sine of the third angle.

5. The method of claim 4, wherein the first, second and third angles are pitch angles.

6. The method of claim 4, wherein the first, second and third angles are yaw angles.

7. A method of calibrating an acceleration sensor for a vehicle having a silicon proof mass resiliently suspended between a pair of capacitor plates and connected to an electronic control unit comprising:
    positioning the acceleration sensor at a first angle A1;
    communicating and storing the first angle A1 with the electronic control unit;
    measuring and storing a first output voltage V1 of the acceleration sensor at the first angle A1;
    positioning the acceleration sensor at a second angle A2;
    communicating and storing the second angle A2 with the electronic control unit;
    measuring and storing a second output voltage V2 of the acceleration sensor at the second angle A2;
    calculating and storing a sensitivity factor as a ratio equal to a difference between the first and second output voltages V2−V1 divided by a difference between the first and second angles A2−A1;
    calculating and storing a zero position output voltage which is equal to the first output voltage minus a product of the sensitivity factor times the sine of the first angle.

* * * * *